(12) United States Patent
Chen et al.

(10) Patent No.: US 9,255,225 B2
(45) Date of Patent: Feb. 9, 2016

(54) METHOD FOR PREPARING LIQUID HYDROCARBONS FROM SYNGAS

(71) Applicant: Wuhan Kaidi Engineering Technology Research Institute Co., Ltd., Wuhan (CN)

(72) Inventors: Yilong Chen, Wuhan (CN); Kan Song, Wuhan (CN); Pingyu Kuai, Wuhan (CN); Yan Gong, Wuhan (CN); Yanfeng Zhang, Wuhan (CN); Jiaqi Jin, Wuhan (CN)

(73) Assignee: Wuhan Kaidi Engineering Technology Research Institute Co., Ltd., Wuhan (CN)

( * ) Notice: Subject to any disclaimer, the term of this patent is extended or adjusted under 35 U.S.C. 154(b) by 0 days.

(21) Appl. No.: 14/569,774

(22) Filed: Dec. 14, 2014

(65) Prior Publication Data

US 2015/0099814 A1   Apr. 9, 2015

Related U.S. Application Data

(63) Continuation-in-part of application No. PCT/CN2013/074726, filed on Apr. 25, 2013.

(30) Foreign Application Priority Data

Jun. 26, 2012  (CN) .......................... 2012 1 0212941

(51) Int. Cl.
| | |
|---|---|
| *C07C 1/04* | (2006.01) |
| *C10G 2/00* | (2006.01) |
| *C10K 1/00* | (2006.01) |
| *C10K 3/00* | (2006.01) |
| *C10J 3/00* | (2006.01) |

(52) U.S. Cl.
CPC . *C10G 2/32* (2013.01); *C10K 1/002* (2013.01); *C10K 3/00* (2013.01); *C01B 2203/0475* (2013.01); *C01B 2203/0495* (2013.01); *C01B 2203/062* (2013.01); *C10G 2300/1011* (2013.01); *C10J 3/00* (2013.01); *C10J 2300/0916* (2013.01); *C10J 2300/1618* (2013.01); *C10J 2300/1659* (2013.01); *Y02E 50/32* (2013.01)

(58) Field of Classification Search
CPC .............. C07C 1/04; C10G 2/00; C10G 2/32; C10G 2/33
USPC ........................................ 518/700, 702–505
See application file for complete search history.

(56) References Cited

U.S. PATENT DOCUMENTS

| | | | |
|---|---|---|---|
| 8,354,457 B2 * | 1/2013 | Ernst ............................. | 518/700 |
| 2013/0072583 A1 * | 3/2013 | Koskinen et al. ............. | 518/703 |

FOREIGN PATENT DOCUMENTS

WO   WO 2011141635 A1 * 11/2011

* cited by examiner

*Primary Examiner* — Sudhakar Katakam
(74) *Attorney, Agent, or Firm* — Matthias Scholl P.C.; Matthias Scholl

(57) ABSTRACT

A method for preparing a liquid hydrocarbon from syngas. The method includes: 1) mixing crude syngas from a biomass gasifier and a hydrogen-rich gas to yield a mixed gas; 2) dehydrating and decarbonizing the mixed gas for removal of moisture, carbon dioxide, and impurities, to yield a fine syngas; 3) introducing the fine syngas to a Fischer-Tropsch synthesis device in the presence of a catalyst, controlling a reaction temperature of the Fischer-Tropsch synthesis at between 150 and 300° C. and a reaction pressure of between 2 and 4 MPa (A), to yield a liquid hydrocarbon and water which is discharged out of the Fischer-Tropsch synthesis device; and 4) returning 70-95 vol. % of exhaust gases from the Fischer-Tropsch synthesis device to step 3) to mix with the fine syngas, and introducing the resulting mixed gas to the Fischer-Tropsch synthesis device.

10 Claims, 1 Drawing Sheet

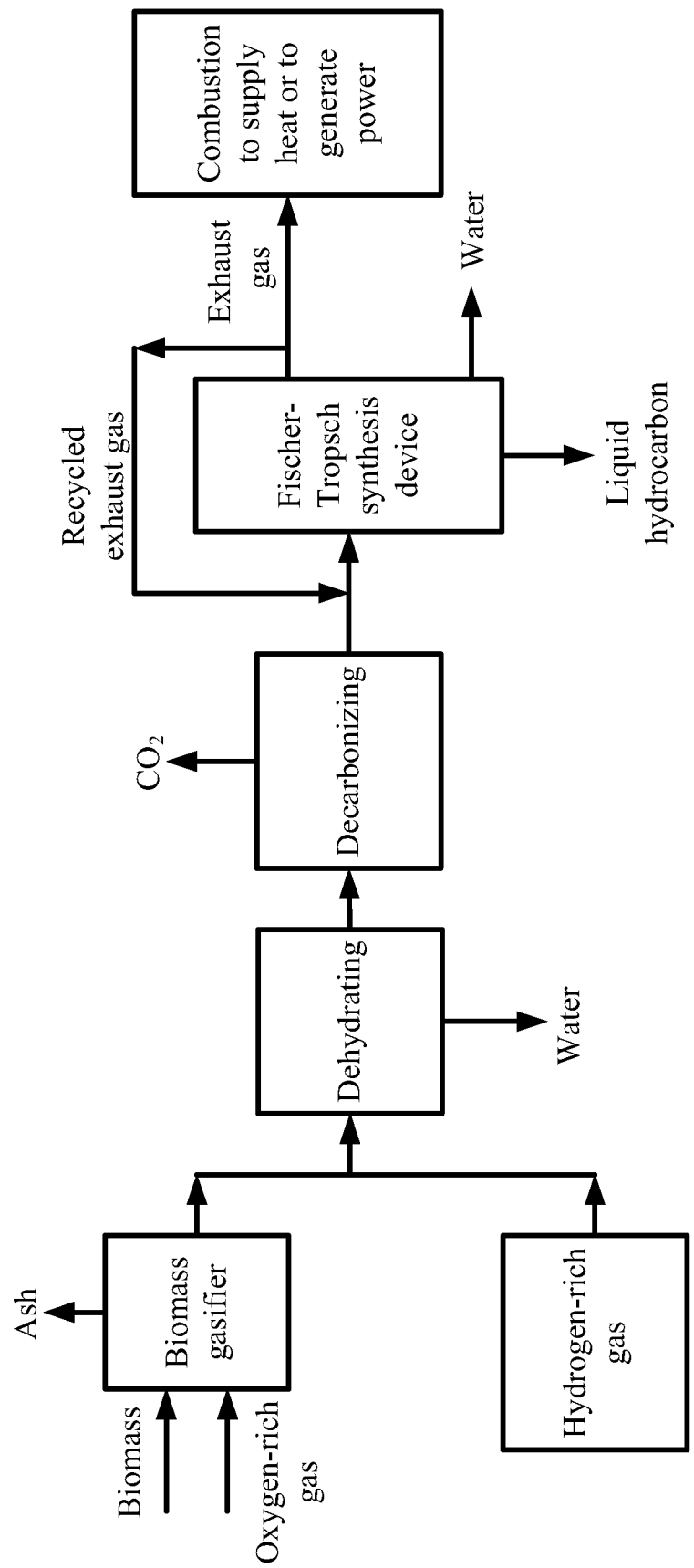

METHOD FOR PREPARING LIQUID HYDROCARBONS FROM SYNGAS

CROSS-REFERENCE TO RELATED APPLICATIONS

This application is a continuation-in-part of International Patent Application No. PCT/CN2013/074726 with an international filing date of Apr. 25, 2013, designating the United States, now pending, and further claims priority benefits to Chinese Patent Application No. 201210212941.2 filed Jun. 26, 2012. The contents of all of the aforementioned applications, including any intervening amendments thereto, are incorporated herein by reference. Inquiries from the public to applicants or assignees concerning this document or the related applications should be directed to: Matthias Scholl P.C., Attn.: Dr. Matthias Scholl Esq., 245 First Street, 18th Floor, Cambridge, Mass. 02142.

BACKGROUND OF THE INVENTION

1. Field of the Invention

The invention relates to a method for preparing liquid hydrocarbons from syngas.

2. Description of the Related Art

The reforming procedure is a common step in the Fischer-Tropsch synthesis process. Specifically, the raw gas is required to be reformed through a water-gas shift reaction: $CO+H_2O \Rightarrow CO_2+H_2$. However, the treated raw syngas still has low ratio of hydrogen to carbon, which cannot meet the requirement for Fischer-Tropsch synthesis. In general, the treatment load of the water-gas shift reaction is heavy, which increases the production costs and reduces the production efficiency. And in addition, the produced exhaust gases are directly discharged, resulting in pollution and waste.

SUMMARY OF THE INVENTION

In view of the above-described problems, it is one objective of the invention to provide a method for preparing a liquid hydrocarbon from syngas that features high efficiency, simplicity, and low costs. The method does not involve a water-gas shift reaction, so it has a simplified process, and the carbon dioxide emission is greatly reduced.

To achieve the above objective, in accordance with one embodiment of the invention, there is provided a method for preparing a liquid hydrocarbon from syngas, the method comprising:

1) mixing crude syngas from a biomass gasifier and a hydrogen-rich gas to yield a mixed gas, wherein a volume ratio of the hydrogen-rich gas to the crude syngas is between 0.7 and 2.1;
2) dehydrating and decarbonizing the mixed gas for removal of moisture, carbon dioxide, and impurities, to yield a fine syngas;
3) introducing the fine syngas to a Fischer-Tropsch synthesis device for Fischer-Tropsch synthesis in the presence of a catalyst, controlling a reaction temperature of the Fischer-Tropsch synthesis at between 150 and 300° C. and a reaction pressure of between 2 and 4 MPa (A), to yield a liquid hydrocarbon and water which is discharged out of the Fischer-Tropsch synthesis device; and
4) returning 70-95 vol. % of exhaust gases from the Fischer-Tropsch synthesis device to step 3) to mix with the fine syngas, and introducing a resulting mixed gas to the Fischer-Tropsch synthesis device.

In a class of this embodiment, in step 1), the hydrogen-rich gas comprises 60-99 vol. % of hydrogen.

In a class of this embodiment, in step 3), the fine syngas has a $H_2/CO$ volume ratio of between 1.8 and 3.0, and comprises 50-99 vol. % of effective components $H_2+CO$.

In a class of this embodiment, in step 3), the fine syngas has a $H_2/CO$ volume ratio of between 2 and 2.5, and comprises 80-99 vol. % of effective components $H_2+CO$.

In a class of this embodiment, in step 1), the volume ratio of the hydrogen-rich gas to the crude syngas is between 0.7:1 and 1.34:1, and the hydrogen-rich gas comprises 70-99 vol. % of hydrogen.

In a class of this embodiment, in step 1), the volume ratio of the hydrogen-rich gas to the crude syngas is between 0.96:1 and 1.1:1, and the hydrogen-rich gas comprises 80-90 vol. % of hydrogen.

In a class of this embodiment, in step 3), the reaction temperature of the Fischer-Tropsch synthesis is between 180 and 230° C. and a reaction pressure is between 2 and 2.5 MPa (A).

In a class of this embodiment, in step 3), part of the exhaust gases is used for combustion to generate power or supply heat.

In a class of this embodiment, in step 1), the volume ratio of the hydrogen-rich gas to the crude syngas is between 0.96:1, and the hydrogen-rich gas comprises 90 vol. % of hydrogen; in step 3), the reaction temperature of the Fischer-Tropsch synthesis is 200° C. and a reaction pressure is 2.5 MPa (A); the fine syngas has a $H_2/CO$ volume ratio of 2.15, and comprises 90 vol. % of effective components $H_2+CO$.

In a class of this embodiment, in step 1), the volume ratio of the hydrogen-rich gas to the crude syngas is between 1.1:1, and the hydrogen-rich gas comprises 80 vol. % of hydrogen; in step 3), the reaction temperature of the Fischer-Tropsch synthesis is 190° C. and a reaction pressure is 2.2 MPa (A); the fine syngas has a $H_2/CO$ volume ratio of 2.2, and comprises 84 vol. % of effective components $H_2+CO$.

Advantages according to embodiments of the invention are summarized as follows:

1. The invention employs a hydrogen-rich gas to improve the low hydrogen/carbon ratio of the syngas, no need to involve the water-gas shift reaction. Carbon dioxide is removed from the resulting mixed gas whereby yielding fine syngas. Thus, the carbon efficiency of the biomass is improved, and the production efficiency of the system is enhanced.
2. The production process is simplified, thereby saving the investment and energy consumption.
3. The exhaust gases are used for combustion to generate power of supply heat, which ensures the biomass resources to be utilized with high efficiency, and reduces the $CO_2$ emission.

BRIEF DESCRIPTION OF THE DRAWINGS

The invention is described hereinbelow with reference to accompanying drawings, in which the sole FIGURE is a flow chart of a method for preparing a liquid hydrocarbon from syngas.

DETAILED DESCRIPTION OF THE EMBODIMENTS

For further illustrating the invention, experiments detailing a method for preparing a liquid hydrocarbon from syngas are described below. It should be noted that the following examples are intended to describe and not to limit the invention.

The sole FIGURE is a flow chart of a method for preparing a liquid hydrocarbon from syngas.

A method for preparing a liquid hydrocarbon from syngas, comprises:

1) mixing crude syngas from a biomass gasifier and a hydrogen-rich gas to yield a mixed gas, where a volume ratio of the hydrogen-rich gas to the crude syngas is between 0.7 and 2.1, preferably, between 1.1 and 1.7;
2) dehydrating and decarbonizing the mixed gas for removal of moisture, carbon dioxide, and impurities, to yield a fine syngas;
3) introducing the fine syngas to a Fischer-Tropsch synthesis device for Fischer-Tropsch synthesis in the presence of a catalyst, to yield a liquid hydrocarbon and water which is discharged out of the Fischer-Tropsch synthesis device; and
4) returning 70-95 vol. % of exhaust gases from the Fischer-Tropsch synthesis device to step 3) to mix with the fine syngas, and introducing a resulting mixed gas to the Fischer-Tropsch synthesis device.

In step 1), the hydrogen-rich gas comprises 60-99 vol. % of hydrogen, preferably, 77-84 vol. %.

In step 3), the fine syngas has a $H_2/CO$ volume ratio of between 1.8 and 3.0, and comprises 50-99 vol. % of effective components $H_2+CO$.

Preferably, in step 3), the fine syngas has a $H_2/CO$ volume ratio of between 2 and 2.5, and comprises 80-99 vol. % of effective components $H_2+CO$.

The reaction temperature of the Fischer-Tropsch synthesis is at between 150 and 300° C. and a reaction pressure is between 2 and 4 MPa (A). The catalyst is a Fe-based or Co-based catalyst, and the reactor is a fixed bed, fluidized bed, circulating fluidized bed, or slurry bed.

In step 3), part of the exhaust gases is used for combustion to generate power or supply heat. The heat energy or generated power is supplied for local areas or surrounding areas, to provide drive power for combustion turbines or steam turbines.

The hydrogen-rich gas is from fertilizer plants, petrochemical plants, water-electrolytic devices, or other hydrogen generation devices.

In step 1), the hydrogen/carbon monoxide volume ratio of the crude syngas is 0.1-2. If the gasifier is absence of moisture, the volume ratio is often 0.1-1.

In step 2), the impurities comprise sulfides, oxynitrides, metal compounds, or other compounds that can deactivate or reduce the activity of the catalysts.

The recycled exhaust gas is a mixture comprising syngas, inert gas, and hydrocarbons, which is discharged from the Fischer-Tropsch synthesis device and returned to the Fischer-Tropsch synthesis via supercharging equipment.

The liquid hydrocarbon in step 3) comprises naphtha, diesel, Fischer-Tropsch wax, which can be further processed to synthesize diesel, aviation kerosene, ethylene, propylene.

Example 1

A biomass gasifier produces crude syngas with a production rate of 4000 Nm³/h. The components of the crude syngas are listed in Table 1. The volume ratio of hydrogen/carbon monoxide is 0.39.

TABLE 1

| Components of crude syngas | |
|---|---|
| Components | Vol. % |
| $H_2$ | 19 |
| CO | 49 |
| $CO_2$ | 24 |
| $CH_4$ | 2 |
| $N_2$ | 6 |

The reaction conditions of the Fischer-Tropsch synthesis are preset as follows:

1) The volume ratio of the hydrogen-rich gas to the crude syngas is 1.7:1, and the hydrogen-rich gas comprises 60 vol. % of hydrogen.
2) The reaction temperature of the Fischer-Tropsch synthesis is 180° C.
3) The reaction pressure of the Fischer-Tropsch synthesis is 2.0 MPa (A).

Based on the above preset reaction conditions, the main logistics data and performance parameters of the method are summarized as follows:

1) The fine syngas for Fischer-Tropsch synthesis has a $H_2/CO$ volume ratio of 2.5, and comprises 65 vol. % of effective components $H_2+CO$;
2) The production rate of the liquid hydrocarbon is 805 kg per hour;
3) 2.3 tons of carbon dioxide is discharged for producing every ton of liquid hydrocarbon, which is reduced by 77% compared with conventional methods adopting water gas shift reaction under the same working conditions.

Example 2

The applied crude syngas is the same as that in Example 1. The reaction conditions of the Fischer-Tropsch synthesis are preset as follows:

1) The volume ratio of the hydrogen-rich gas to the crude syngas is 1.34:1, and the hydrogen-rich gas comprises 70 vol. % of hydrogen.
2) The reaction temperature of the Fischer-Tropsch synthesis is 220° C.
3) The reaction pressure of the Fischer-Tropsch synthesis is 3.5 MPa (A).

Based on the above preset reaction conditions, the main logistics data and performance parameters of the method are summarized as follows:

1) The fine syngas for Fischer-Tropsch synthesis has a $H_2/CO$ volume ratio of 2.3, and comprises 77 vol. % of effective components $H_2+CO$;
2) The production rate of the liquid hydrocarbon is 844 kg per hour;
3) 2.2 tons of carbon dioxide is discharged for producing every ton of liquid hydrocarbon, which is reduced by 80% compared with conventional methods adopting water gas shift reaction under the same working conditions.

Example 3

1) The volume ratio of the hydrogen-rich gas to the crude syngas is 1.1:1, and the hydrogen-rich gas comprises 80 vol. % of hydrogen.
2) The reaction temperature of the Fischer-Tropsch synthesis is 190° C.
3) The reaction pressure of the Fischer-Tropsch synthesis is 2.2 MPa (A).

Based on the above preset reaction conditions, the main logistics data and performance parameters of the method are summarized as follows:

1) The fine syngas for Fischer-Tropsch synthesis has a $H_2/CO$ volume ratio of 2.2, and comprises 84 vol. % of effective components $H_2+CO$;
2) The production rate of the liquid hydrocarbon is 880 kg per hour;
3) 2.14 tons of carbon dioxide is discharged for producing every ton of liquid hydrocarbon, which is reduced by 79% compared with conventional methods adopting water gas shift reaction under the same working conditions.

Example 4

1) The volume ratio of the hydrogen-rich gas to the crude syngas is 0.96:1, and the hydrogen-rich gas comprises 90 vol. % of hydrogen.
2) The reaction temperature of the Fischer-Tropsch synthesis is 200° C.
3) The reaction pressure of the Fischer-Tropsch synthesis is 2.5 MPa (A).

Based on the above preset reaction conditions, the main logistics data and performance parameters of the method are summarized as follows:

1) The fine syngas for Fischer-Tropsch synthesis has a $H_2/CO$ volume ratio of 2.15, and comprises 90 vol. % of effective components $H_2+CO$;
2) The production rate of the liquid hydrocarbon is 914 kg per hour;
3) 2.06 tons of carbon dioxide is discharged for producing every ton of liquid hydrocarbon, which is reduced by 79% compared with conventional methods adopting water gas shift reaction under the same working conditions.

Example 5

1) The volume ratio of the hydrogen-rich gas to the crude syngas is 0.9:1, and the hydrogen-rich gas comprises 99 vol. % of hydrogen.
2) The reaction temperature of the Fischer-Tropsch synthesis is 230° C.
3) The reaction pressure of the Fischer-Tropsch synthesis is 3.0 MPa (A).

Based on the above preset reaction conditions, the main logistics data and performance parameters of the method are summarized as follows:

1) The fine syngas for Fischer-Tropsch synthesis has a $H_2/CO$ volume ratio of 2, and comprises 94 vol. % of effective components $H_2+CO$;
2) The production rate of the liquid hydrocarbon is 946 kg per hour;
3) 1.99 tons of carbon dioxide is discharged for producing every ton of liquid hydrocarbon, which is reduced by 80% compared with conventional methods adopting water gas shift reaction under the same working conditions.

Example 6

1) The volume ratio of the hydrogen-rich gas to the crude syngas is 0.7:1, and the hydrogen-rich gas comprises 99 vol. % of hydrogen.
2) The reaction temperature of the Fischer-Tropsch synthesis is 250° C.
3) The reaction pressure of the Fischer-Tropsch synthesis is 3.2 MPa (A).

Based on the above preset reaction conditions, the main logistics data and performance parameters of the method are summarized as follows:

1) The fine syngas for Fischer-Tropsch synthesis has a $H_2/CO$ volume ratio of 1.8, and comprises 96 vol. % of effective components $H_2+CO$;
2) The production rate of the liquid hydrocarbon is 963 kg per hour;
3) 1.9 tons of carbon dioxide is discharged for producing every ton of liquid hydrocarbon, which is reduced by 82% compared with conventional methods adopting water gas shift reaction under the same working conditions.

Example 7

1) The volume ratio of the hydrogen-rich gas to the crude syngas is 2.1:1, and the hydrogen-rich gas comprises 60 vol. % of hydrogen.
2) The reaction temperature of the Fischer-Tropsch synthesis is 190° C.
3) The reaction pressure of the Fischer-Tropsch synthesis is 2.3 MPa (A).

Based on the above preset reaction conditions, the main logistics data and performance parameters of the method are summarized as follows:

1) The fine syngas for Fischer-Tropsch synthesis has a $H_2/CO$ volume ratio of 3.0, and comprises 66 vol. % of effective components $H_2+CO$;
2) The production rate of the liquid hydrocarbon is 780 kg per hour;
3) 2.4 tons of carbon dioxide is discharged for producing every ton of liquid hydrocarbon, which is reduced by 84% compared with conventional methods adopting water gas shift reaction under the same working conditions.

While particular embodiments of the invention have been shown and described, it will be obvious to those skilled in the art that changes and modifications may be made without departing from the invention in its broader aspects, and therefore, the aim in the appended claims is to cover all such changes and modifications as fall within the true spirit and scope of the invention.

The invention claimed is:

1. A method for preparing a liquid hydrocarbon from syngas, the method comprising:
   1) mixing crude syngas from a biomass gasifier and a hydrogen-rich gas to yield a mixed gas, wherein a volume ratio of the hydrogen-rich gas to the crude syngas is between 0.7 and 2.1;
   2) removing moisture, carbon dioxide, sulfides, oxynitrides, and metal compounds from the mixed gas, and obtaining a fine syngas;
   3) introducing the fine syngas to a Fischer-Tropsch synthesis device for Fischer-Tropsch synthesis in the presence of a catalyst, controlling a reaction temperature of the Fischer-Tropsch synthesis at between 150 and 300° C. and a reaction pressure of between 2 and 4 MPa (A), to yield a liquid hydrocarbon; and
   4) returning 70-95 vol. % of exhaust gases from the Fischer-Tropsch synthesis device to step 3) to mix with the fine syngas, the exhaust gases comprising syngas, inert gas, and hydrocarbons, and introducing a resulting mixed gas to the Fischer-Tropsch synthesis device.

2. The method of claim 1, wherein in 1), the hydrogen-rich gas comprises 60-99 vol. % of hydrogen.

3. The method of claim 2, wherein in 3), the fine syngas has a $H_2/CO$ volume ratio of between 1.8 and 3.0, and comprises 50-99 vol. % of effective components $H_2+CO$.

4. The method of claim 3, wherein 3), the fine syngas has a $H_2/CO$ volume ratio of between 2 and 2.5, and comprises 80-99 vol. % of effective components $H_2+CO$.

5. The method of claim 2, wherein in 1), the volume ratio of the hydrogen-rich gas to the crude syngas is between 0.7:1 and 1.34:1, and the hydrogen-rich gas comprises 70-99 vol. % of hydrogen.

6. The method of claim 5, wherein in 1), the volume ratio of the hydrogen-rich gas to the crude syngas is between 0.96:1 and 1.1:1, and the hydrogen-rich gas comprises 80-90 vol. % of hydrogen.

7. The method of claim 2, wherein in 3), the reaction temperature of the Fischer-Tropsch synthesis is between 180 and 230° C. and a reaction pressure is between 2 and 2.5 MPa (A).

8. The method of claim 2, wherein in 3), part of the exhaust gases is used for combustion to generate power or supply heat.

9. The method of claim 2, wherein in 1), the volume ratio of the hydrogen-rich gas to the crude syngas is between 0.96:1, and the hydrogen-rich gas comprises 90 vol. % of hydrogen; in step 3), the reaction temperature of the Fischer-Tropsch synthesis is 200° C. and a reaction pressure is 2.5 MPa (A); the fine syngas has a $H_2/CO$ volume ratio of 2.15, and comprises 90 vol. % of effective components $H_2+CO$.

10. The method of claim 2, wherein in 1), the volume ratio of the hydrogen-rich gas to the crude syngas is between 1.1:1, and the hydrogen-rich gas comprises 80 vol. % of hydrogen; in step 3), the reaction temperature of the Fischer-Tropsch synthesis is 190° C. and a reaction pressure is 2.2 MPa (A); the fine syngas has a $H_2/CO$ volume ratio of 2.2, and comprises 84 vol. % of effective components $H_2+CO$.

* * * * *